United States Patent
Drahm et al.

(10) Patent No.: US 7,451,662 B2
(45) Date of Patent: Nov. 18, 2008

(54) VIBRATION TYPE MEASUREMENT TRANSDUCER

(75) Inventors: Wolfgang Drahm, Freising (DE); Ennio Bitto, Aesch (CH); Rainer Lorenz, Lörrach (DE)

(73) Assignee: Endress + Hauser Flowtec AG, Reinach (CH)

( * ) Notice: Subject to any disclaimer, the term of this patent is extended or adjusted under 35 U.S.C. 154(b) by 311 days.

(21) Appl. No.: 11/362,054

(22) Filed: Feb. 27, 2006

(65) Prior Publication Data

US 2006/0201260 A1    Sep. 14, 2006

Related U.S. Application Data

(60) Provisional application No. 60/655,912, filed on Feb. 25, 2005.

(30) Foreign Application Priority Data

Feb. 25, 2005    (EP) .................................. 05004166

(51) Int. Cl.
*G01F 1/84* (2006.01)

(52) U.S. Cl. ................................. 73/861.357
(58) Field of Classification Search ............ 73/861.357, 73/861.355, 861.356, 273
See application file for complete search history.

(56) References Cited

U.S. PATENT DOCUMENTS

| | | | | |
|---|---|---|---|---|
| 5,347,874 A | * | 9/1994 | Kalotay et al. | ......... 73/861.357 |
| 5,365,794 A | * | 11/1994 | Hussain et al. | ......... 73/861.357 |
| 5,850,039 A | * | 12/1998 | Van Cleve et al. | ..... 73/861.357 |
| 6,330,832 B1 | * | 12/2001 | Normen et al. | ........ 73/861.357 |
| 6,474,175 B2 | | 11/2002 | Davies | |
| 6,519,828 B1 | | 2/2003 | Cook | |
| 2002/0108448 A1 | | 8/2002 | Behm | |
| 2003/0025325 A1 | | 2/2003 | Rehmann et al. | |

FOREIGN PATENT DOCUMENTS

| | | |
|---|---|---|
| DE | G 91 09 176.4 | 10/1991 |
| DE | 199 36 008 A1 | 3/2001 |
| DE | 100 03 784 A1 | 7/2001 |
| DE | 100 03 784 A1 | 7/2002 |
| DE | 102 21 931 A1 | 11/2002 |
| DE | 697 17 470 T2 | 4/2003 |
| DE | 102 33 307 A1 | 2/2004 |
| EP | 0 984 248 A1 | 9/1998 |

* cited by examiner

*Primary Examiner*—Jewel V Thompson
(74) *Attorney, Agent, or Firm*—Bacon & Thomas, PLLC

(57) ABSTRACT

The measurement transducer includes: At least one interconnected system (1, 2) formed by means of at least two components (1, 2), especially components (1, 2) of metal. At least the first component (1) of the interconnected system is, in such case, embodied as a composite, formed part composed of at least two materials, which differ from one another with respect to at least one physical and/or chemical property, especially a material density, melting temperature, coefficient of thermal expansion and/or modulus of elasticity, etc. As a result of using at least one composite component (1), the at least two components of the interconnected system (1, 2) can be bonded together lastingly and reliably, especially by means of welding, such being true especially also for the case in which the interconnected system is a bi-, or poly-, metal, interconnected system (1, 2).

25 Claims, 7 Drawing Sheets

VIBRATION TYPE MEASUREMENT TRANSDUCER

FIELD OF THE INVENTION

The invention relates to a vibration-type measurement-transducer with an interconnected system of a first component, especially a first component of metal, and a second component connected with the first component, especially a second component likewise of metal.

BACKGROUND OF THE INVENTION

In industrial measurement and automation technology, inline measuring devices utilizing a vibration-type measurement-transducer are often used for the highly accurate registering of measured, process variables of media flowing in lines, especially pipelines, and especially for the registering of flow-dynamic and/or rheological, measured variables. Such measurement transducers include at least one measuring tube, which is in communication with the medium-conveying pipeline and which vibrates during operation. Construction, operation, and ways of applying such vibration-type measurement-transducers are described comprehensively and in detail in U.S. Pat. Nos. 4,127,028, 4,524,610, 4,768,384, 4,793,191, 4,823,614, 5,253,533, 5,610,342, 5,796,011, 5,705,754, 6,006,609, 6,047,457, 6,168,069, 6,314,820, 6,352,196, 6,374,478, 6,397,685, 6,450,042, 6,487,917, 6,516,674, 6,519,828, 6,523,421, 6,598,281, 6,666,098, 6,698,644, 6,711,958, 6,769,163, 6,851,323, WO-A 03/048693, WO-A 05/050144 or in the not pre-published, U.S. patent application Ser. No. 11/242,803 of the present assignee.

As is known, vibration-type measurement-transducers serve in conjunction with a measuring device electronics connected thereto for producing, in the medium instantaneously conveyed in the at least one measuring tube, reaction forces appropriately corresponding with the process variable to be measured, such as e.g. Coriolis forces corresponding to a mass flow, e.g. a mass flow rate, inertial forces corresponding to a density, or frictional forces corresponding to a viscosity, etc., and to produce, derived therefrom, a measurement signal appropriately corresponding with the process measured variable, for example the particular mass flow, the particular viscosity and/or the particular density, of the medium. The at least one measuring tube of the measurement transducer is, for such purpose, usually medium-tight, especially pressure-tight, and, most often, also installed durably into the course of the pipeline conveying the medium. For instance, the measuring tube can be installed into the pipeline by means of appropriate flange connectors. For the oscillatable holding of the at least one measuring tube, a tubular or frame-like support element, for example of steel, is provided. The support element is, most often, embodied much more stiffly than the measuring tube and is mechanically coupled to the measuring tube at its inlet and outlet ends. For example, the support element is affixed directly to the measuring tube. The support element can, as is usual for measurement transducers of such type and as is also perceivable, without more, from the above-cited state of the art, be completed to form a measurement transducer housing, which encases the transducer, by means of appropriately externally applied covers, such as e.g. tube-covering caps or laterally mounted sheets, or the support element can itself be embodied as the measurement transducer housing.

For driving the at least one measuring tube, measurement transducers of the described kind additionally include an exciter mechanism eclectically connected with the relevant measuring device electronics and having an oscillation exciter, especially an electrodynamic or electromagnetic one, mechanically interacting with the measuring tube. During operation, the exciter mechanism is so actuated by the measuring device in suitable manner by means of corresponding exciter signals, that the measuring tube executes, at least at times, vibrations, especially bending oscillations and/or torsional oscillations. Additionally present is a sensor arrangement delivering oscillation measurement signals. At least in the case of use of the measurement transducer as a Coriolis mass flow measurement transducer, the sensor arrangement includes at least two sensor elements separated from one another and reacting to measuring tube vibrations of the measuring tube, respectively, at its inlet end and at its outlet end.

Besides the opportunity of simultaneously measuring a plurality of such process variables, especially mass flow, density and/or viscosity, by means of one and the same measuring device, a further essential advantage of inline measuring devices with vibration-type measurement-transducers is, among other things, that they exhibit, within predetermined operating limits, a very high measurement accuracy at comparatively low sensitivity to disturbances. Moreover, such a measuring device can be used for practically any flowable or streamable media and can be applied in a multitude of the most different of areas of application of measuring and automation technology.

In the case of inline measuring devices of the described kind, which are applied as Coriolis mass flow meters, the associated measuring device electronics determines, during operation, among other things, a phase difference between the two oscillation measurement signals delivered by the sensor elements and the measuring device electronics issues at its output a measured value signal derived therefrom. The measured value signal represents a measured value corresponding to the time behavior of the mass flow. If, as is usual in the case of such inline measuring devices, the density of the medium is also to be measured, then the measuring device electronics determines therefor, additionally, on the basis of the oscillation measurement signals, an instantaneous oscillation frequency of the measuring tubes. Moreover, also, for example, the viscosity of the medium can be measured by means of the power, especially a corresponding exciter current for the exciter arrangement, needed for maintaining the measuring tube oscillations.

For the operation of the measurement transducer, especially also for the further processing or for the evaluation of the at least one measurement signal, such is, as already indicated, electrically connected with an appropriate measuring device electronics. In industrial measurement and automation technology, this measuring device electronics is, additionally, often connected, via a data transmission system, e.g. a digital data bus, with other measuring devices and/or with a remote, central computer, to which it sends the measured value signals. Example of suitable data transmission systems often include bus systems, especially serial bus systems, such as PROFIBUS-PA, FOUNDATION FIELDBUS or suchlike, along with the corresponding transmission protocols. By means of the central computer, the transmitted, measured-value signals can be processed further and visualized as corresponding measurement results e.g. on monitors and/or they can be converted into control signals for corresponding actuators, such as e.g. solenoid-operated valves, electric motors of pumps, etc. For accommodating the measuring device electronics, such inline measuring devices further include an electronics housing, which can be situated remotely from the measurement transducer and connected therewith only via a flexible line, as proposed e.g. in WO-A 00/36379, or which is, as shown e.g. also in EP-A 1 296 128 or WO-A 02/099363, arranged directly on the measurement transducer, especially on the already the mentioned measurement transducer housing.

In the case of measurement transducers of the described kind, essentially two kinds of tube forms have become established in the market, namely, on the one hand, essentially straight measuring tubes and, on the other hand, measuring tubes curving essentially in a tube plane. Of this latter class, essentially S-, U- or V-shaped tubes are the ones used most often. Especially in the case of Coriolis mass flow measurement transducers serving for measuring mass flows, in the case of both types of tube shapes, for reasons of symmetry, two measuring tubes are used, extending, most often, essentially parallel to one another in the resting state and flowed-through, most often, also in parallel by the medium. Examples in this regard include U.S. Pat. Nos. 4,127,028, 4,768,384, 4,793,191 5,610,342, 5,796,011, or U.S. Pat. No. 6,450,042.

Besides measurement transducers with such double measuring tube arrangements, however, also measurement transducers having a single straight, or curved, measuring tube have long been obtainable in the market. Such vibration-type measurement-transducers with a single measuring tube are described e.g. in U.S. Pat. Nos. 4,524,610, 4,823,614, 5,253, 533, 6,006,609, 6,047,457, 6,168,069, 6,314,820, 6,397,685, 6,487,917, 6,516,674, 6,666,098, 6,698,644, 6,711,958, WO-A 03/048693, or the mentioned application DE10354373.2 of the assignee. Each of the measurement transducers shown therein include, among other things: A measuring tube vibrating, at least at times, having an inlet end and an outlet end, and made, for example, of steel, titanium, tantalum or zirconium or corresponding alloys, for conveying the medium to be measured, wherein the measuring tube communicates with a connected pipeline via a first tube segment opening into the inlet end and via a second tube segment opening into the outlet end, in order to enable the medium to flow through the measuring tube, and wherein the measuring tube, during operation, executes mechanical oscillations about an oscillation axis imaginarily connecting the two tube segments; and a, most often, very bending-stiff, tubular or frame-like, support element, for example of steel, for the oscillatable holding of the measuring tube, which is affixed to the first tube segment by means of a first transition piece and to the second tube segment by means of a second transition piece.

For the case described above, wherein the measurement transducer used is one with a single measuring tube, additionally provided in the measurement transducer is a counteroscillator affixed to the measuring tube and suspended oscillatably in the measurement transducer housing. This counteroscillator serves, apart from its function involving the mounting of the oscillation exciter and the sensor elements, for uncoupling, as far as oscillations are concerned, the vibrating measuring tube from the connected pipeline. The counteroscillator, which is most often made of steel, because of the favorable cost thereof, can, in such case, be embodied as a tubular, compensation cylinder, or box-shaped support frame, arranged coaxially to the measuring tube. To the referenced ensemble of features of the individual measurement transducers described above is still to be added, that a straight measuring tube, or straight measuring tubes, as the case may be, is/are, most often, made of pure titanium, a titanium alloy of high titanium content, pure zirconium or a zirconium alloy of high zirconium content, since, compared with measuring tubes of stainless steel, which is likewise possible for straight measuring tubes, usually shorter construction lengths result, and that a curved measuring tube, or curved measuring tubes, as the case may be, is/are especially of stainless steel, although titanium or zirconium, or their alloys, as the case may be, are also, in this instance, possible for the material of the measuring tubes. Beyond this, however, the use of tantalum or corresponding tantalum alloys is, for example, usual as material for the measuring tube, or tubes.

As can be derived, without difficulty, from the above review, practically every measurement transducer of the above-cited state of the art involves at least one, especially bi-, or poly-, metal, interconnected system, which includes a first component—for example, the first or the second end piece—and a second component—for example, the measuring tube—extending at least partially through the first component along an imaginary longitudinal axis of the interconnected system, wherein, usually, the second component contacts with an outer surface in the form of a cylindrical outer surface, flushly, an inner surface of the first component, formed by an inner wall of a bore extending within the first component. Equally, however, also measurement transducers are constructed with double measuring tube arrangements, as especially also described in U.S. Pat. No. 5,610,342, usually of a plurality of such, especially bi-metal, interconnected systems. Besides the interconnected system formed by measuring tube and end piece, other examples of such, especially bi-metal, interconnected systems are cited, especially also the connection of measuring tube and flange, or the connection flange and measurement transducer housing; compare, in this connection, also U.S. Pat. Nos. 6,168,069, 6,352,196, and 6,698,644. Additionally, such a composite system can also be formed, as also described in U.S. Pat. No. 6,047,457, by the affixing of at least one circular, washer-, or disk-, shaped, metal member to the measuring tube between the two end pieces, to serve as a part of the exciter mechanism, or to interact therewith, as the case may be. Beyond this, such metal members can also serve as part of the sensor arrangement or as couplers between the measuring tube and the possibly provided, counteroscillator.

Imposed on the vibration-type measurement-transducers used in industrial measurements and automation technology are very high requirements as regards accuracy of measurement, with such lying, usually, in the range of about 0.1% of the measured value and/or 0.01% of the measured value at the upper end of the range. Required to achieve this is, especially, a very high stability of the zero point, as well as a very high robustness of the delivered measurement signals, especially also in the case of environmental, attachment and/or operating conditions which change significantly during operation. As already discussed in detail in the mentioned U.S. Pat. Nos. 5,610,342, 6,047,457, 6,168,069, 6,519,828, 6,598,281, 6,698,644, 6,769,163, WO-A 03/048693, or the mentioned applications DE102004048765.0 or DE10354373.2 of the assignee, also the mechanical strength, especially the fatigue strength, with which, in such case, the individual components of the aforementioned interconnected systems formed in the measurement transducer are affixed to one another, is assigned a considerable importance. Already the slightest deviation of the strength of the aforementioned interconnected systems from the situation present at calibration can result in significant, no longer manageable fluctuations of the zero point and/or sensitivity and, thus, in practically unusable measurement signals. Usually, such zero point errors attributable to strength-loss phenomena in the interconnected systems can only be eliminated by installation of a new inline measuring device. Particularly the way in which the measuring tube is secured within the outer support element and the possibly present counteroscillator has, in such case, a special influence on the stability of the zero point and/or the availability of the measurement transducer; this subject is also already discussed in detail in U.S. Pat. Nos. 5,610,342, 6,047,457, 6,168,069, 6,598,281, 6,634,241, or WO-A 03/048693.

Traditionally, the components of such interconnected systems are, at least in part, bonded together by soldering, brazing or welding. Thus, for example, it is already discussed in U.S. Pat. No. 4,823,614, that the respective ends of the one measuring tube are inserted in bores of their assigned inlet and outlet, end pieces and secured therein by front and rear welding, soldering or brazing; compare the material beads to be seen in some of the figures. The end pieces are, in turn, secured in the outer support element. Further examples of such interconnected systems with bonded connections are shown in U.S. Pat. Nos. 6,168,069, 6,352,196, 6,519,828, 6,523,421, 6,598,281, 6,698,644, or U.S. Pat. No. 6,769,163, among others.

Especially for the above-described case, in which the first component serves as a coupler between the measuring tube, as second component, and a third component in the form of a counteroscillator, there exists in the manufacture of the measurement transducer, however, to such extent, often a considerable problem in that, depending on the manner of construction and/or on the requirements placed on the measurement transducer on the basis of its application, at least two components are to be connected together oscillation-resistantly, which are made of different metals, for example steel and titanium. In bi-metal, interconnected systems, thus those in which at least the first component and the second component are made of different metals, it is, unfortunately, not always possible, without more, to prevent, with certainty, strength-loss in the interconnections. As can be perceived, for example, from U.S. Pat. Nos. 6,047,457, 6,168,069, 6,352, 196, 6,598,281, 6,634,241, 6,523,421 or 6,698,644, namely, problems can arise in the case of such bi-metal, interconnected systems with regard to the long-term strength of the solder, or braze, connections which had to be used because of the lacking weldability. Such problems can be attributed to, among other things, insufficient wetting and/or radially alternating, mechanical loading of the joints. This last is especially attributable to the, in part, significantly differing thermal expansions of the components, be it during manufacture or during operation. A further problem of such bonded, solder or braze connections is also the material-degrading, oscillatory wear in the area of the joints, pointed out in U.S. Pat. Nos. 6,519,828, or 6,598,281.

A possibility for reducing this risk of strength-loss in interconnected systems formed, for example, by a measuring tube of a Coriolis mass flow measurement transducer and a metal member pushed thereon and affixed thereto can be provided, according to U.S. Pat. No. 6,698,644, by having the components introduce additional compressive stresses into the solder, or braze, connection, whereby the preferably large-area, solder or braze connection between the components can be stabilized. A further possibility for improving the longterm strength of such interconnected systems lies in affixing the components together using press joints. Thus, in the already mentioned U.S. Pat. No. 5,610,342, as well as in WO-A 03/048693, in each case, a securement method is proposed for measuring tubes in end pieces, wherein each end of the measuring tube is inserted into a corresponding bore of an inlet end piece, or an outlet end piece, as the case may be, and pressure is applied to the inner wall of the bore, especially in the absence of heating, by means of a roller tool placed in the end, whereby a high-strength, frictionally interlocking connection is formed between the first and second components. A roller tool appropriately suited for this method is, for example, also described in U.S. Pat. No. 4,090,382, in the context of a method of manufacturing boilers or heat exchangers. A further possibility for manufacturing such interconnected systems formed by means of high-strength, frictionally interlocking connections is, as e.g. also proposed in U.S. Pat. No. 6,047,457, to compress the first component, after it has been pushed, or slipped, onto the second component, by means of a pressing tool, so that the first component undergoes mixed plastic-elastic deformation below a recrystallization temperature of the material of the component, especially at room temperature. The deformation forces applied for this purpose are, in such case, always so developed, that the second component experiences essentially no cross sectional reduction and/or narrowing, so that an initial inner diameter of the second component remains practically unchanged throughout, after manufacture of the interconnected system. A suitable apparatus for the pressing is shown, for example, in U.S. Pat. No. 3,745,633. Alternatively to the plastic-elastic pressing, such an interconnected system formed by means of frictional interlocking can also be produced, for example, by, as also shown in U.S. Pat. Nos. 6,598,281 or 6,519,828, thermally shrinking the first component onto the second component or by clamping the first component with the second component using elastically deformable clamping elements.

Going further, U.S. Pat. Nos. 6,598,281, or 6,519,828 disclose that, however, even in the case of purely frictionally interlocking, press connections, it is not always certain, due to oscillatory wear, that possible loss of strength of the interconnected system can be avoided. Moreover, such oscillatory wear of the materials of the interconnected system can lead to corrosion in the area of the mutually contacting surfaces. Furthermore, as can be perceived from WO-A 03/048693, the usually different expansion behaviors of the components of the above interconnected systems, thus for example the above-mentioned end pieces and the tube segments of the measuring tube, in each case, clamped therein, can lead, in the case of temperature fluctuations, especially in the case of possible temperature shocks, such as can arise e.g. in the case of execution of regularly scheduled cleaning measures with extremely hot rinsing liquids, to a sinking of the clamping forces exerted by the first component on the second component below a critical level. This, in turn, can mean that, due to thermally related expansions, the first component and the second component can locationally lose the mechanical contact brought about by the rolling, pressing or shrinking, so that the interconnected system loses strength to an unacceptable degree. As a result off this, in turn, the pull-out strength of the interconnected system can sink, and, to such extent, also, with press joints of such type, the required high zero-point stability of the measurement transducer can not be assured, in the absence of extra measures. For overcoming the deficiency in interconnected systems of the described kind caused by oscillatory wear between the components, it is proposed in U.S. Pat. Nos. 6,598,281 or 6,519,828, as the case may be, additionally to bond the pertinent components together, especially with use of a fill material serving as an intermediate layer, following manufacture of the press-joint, but this raises anew the possibility of the above-mentioned problems associated with soldered or brazed connections. Accordingly, in WO-A 03/048693, an interconnected system is proposed, which is given an increased twist strength, by the measure of forming in the inner wall of the first component a groove running in the direction of the longitudinal axis of the interconnected system. This groove can effectively prevent rotation of the first component relative to the second component by the formation of a mechanical interlocking acting in a circumferential direction. However, also this interconnected system, as proposed, can experience a decrease in its nominal pull-out strength, be it because of oscillatory wear and/or thermally related expansion.

SUMMARY OF THE INVENTION

Starting from the above-described disadvantages regarding longterm strength of such interconnected systems conventionally used in vibration-type measurement-transducers, an object of the invention is to improve vibration-type measurement-transducers such that also components of different chemical and/or physical properties are connectable together with permanence and strongly resistant to the effects of oscillation, so that vibration-type measurement-transducers, even those using components made of different metals, can be manufactured with high longterm strength. Additionally, it is an object of the invention to improve interconnected systems of the described kind such that their components are connectable together with permanence and securely by bonding, especially by means of welding, and this holding especially also for the case in which the interconnected system is bimetal or multi-metal.

For achieving such objects, the invention resides in a vibration-type measurement-transducer, especially a Coriolis mass flow measurement transducer, for a measuring device serving for the measurement of a medium flowing in a line, which measurement transducer includes at least one interconnected system, especially a bi- or multi-metal interconnected system, formed by means of at least one, especially metal, first component and by means of at least one, especially metal, second component. In the measurement transducer of the invention, additionally at least the first component of the interconnected system is itself embodied as a composite component composed of at least two materials, especially at least two metals, which differ from one another with regard to at least one physical and/or with respect to at least one chemical property, especially a material density, a melting temperature, a coefficient of thermal expansion and/or with respect to the modulus of elasticity, etc.

In a first embodiment of the measurement transducer of the invention, each of the at least two mutually differing materials of the first component forms at least 1%, especially more than 10%, of the volume of the first component.

In a second embodiment of the measurement transducer of the invention, the first component is composed of layers of the at least two mutually differing materials, and each of the two materials has a layer thickness of at least 1 mm.

In a third embodiment of the measurement transducer of the invention, a degree of porosity of the composite component is selected to be smaller than 10%, especially essentially smaller than 5%.

In a fourth embodiment of the measurement transducer of the invention, at least one of the at least two materials of the first component is, with respect to at least one physical and/or chemical property, essentially equal to a material of the second component.

In a fifth embodiment of the measurement transducer of the invention, the at least two materials of the first component are connected together at least partially by bonding over a diffusion zone at least sectionally formed within the first component.

In a sixth embodiment of the measurement transducer of the invention, at least the first component of the interconnected system is composed, at least partially, of sintered material.

In a seventh embodiment of the measurement transducer of the invention, at least the first component is at least partially manufactured by means of hot pressing, especially carried out at a high working pressure of over 800 bar and/or a high working temperature of over 700° C.

In an eighth embodiment of the measurement transducer of the invention, the first component is produced by means of hot isostatic pressing.

In a ninth embodiment of the measurement transducer of the invention, at least the first component is composed partially of a cast and/or rolled and/or drawn material.

In a tenth embodiment of the measurement transducer of the invention, at least one of the components is composed, at least partially, of at least one metal.

In an eleventh embodiment of the measurement transducer of the invention, both the first component and the second component are each composed at least partially of metal.

In a twelfth embodiment of the measurement transducer of the invention, at least one of the components is composed at least partially, of steel, especially high grade steel and/or stainless steel.

In a thirteenth embodiment of the measurement transducer of the invention, at least one of the components is composed, at least partially, of titanium, especially a titanium alloy.

In a fourteenth embodiment of the measurement transducer of the invention, at least one of the components is composed, at least partially, of tantalum, especially a tantalum alloy.

In a fifteenth embodiment of the measurement transducer of the invention, at least one of the components is composed, at least partially, of zirconium, especially a zirconium alloy.

In a sixteenth embodiment of the measurement transducer of the invention, each of the at least two materials of the first component is a metal.

In a seventeenth embodiment of the measurement transducer of the invention, the first component is composed at least partially of steel and at least partially of titanium and/or zirconium and/or tantalum.

In an eighteenth embodiment of the measurement transducer of the invention, the at least two components of the interconnected system are at least sectionally connected together by bonding, especially by means of a solder, braze and/or weld connection. In a further development of this embodiment of the invention, the at least two components of the interconnected system are connected together, at least sectionally, by means of a solder, braze and/or weld connection. In another further development of this embodiment of the invention, the at least two components of the interconnected system are at least sectionally connected together via a diffusion zone.

In a nineteenth embodiment of the measurement transducer of the invention, the first component is sintered directly onto the second component, accompanied by the formation of a diffusion zone.

In a twentieth embodiment of the measurement transducer of the invention, the at least two components of the interconnected system are connected at least sectionally together by means of adhesive, especially by means of a plastic.

In a twenty-first embodiment of the measurement transducer of the invention, one of the at least two components of the interconnected system extends at least partially through the other component, along an imaginary longitudinal axis of the interconnected system.

In a twenty-second embodiment of the measurement transducer of the invention, one of the at least two components of the interconnected system surrounds the other of the at least two components at least sectionally at least partially.

In a twenty-third embodiment of the measurement transducer of the invention, one of the at least two components of the interconnected system contacts, with an at least partially curved, especially cylindrical, outer surface, an inner surface of the other of the at least two components of the interconnected system at least sectionally flushly. In a further development of this embodiment of the invention, the inner surface is formed by an inner wall of a bore extending at least in a portion of the particular component. In another further development of this embodiment of the invention, the at least two components of the interconnected system form, at least in part, a press joint, especially a press joint acting in the direction of the longitudinal axis and/or in a circumferential direction of the outer surface of the second component. In such case, clamping forces act on the connecting surfaces of the interconnected system formed by the mutually contacting surfaces of the two components of the interconnected system, especially normal forces directed radially to the longitudinal axis, in such a manner, that at least one of the two components of the interconnected system is deformed, at least partially, permanently elastically, especially mixed elastically-plastically.

In a twenty-fourth embodiment of the measurement transducer of the invention, at least one of the components of the interconnected system is subjected at least partially, lastingly, to elastic deformations, especially mixed plastic-elastic deformations.

In a twenty-fifth embodiment of the measurement transducer of the invention, at least one of the components of the interconnected system has a ring-shape.

In a twenty-sixth embodiment of the measurement transducer of the invention, at least one of the components of the interconnected system has the form of a sleeve.

In a twenty-seventh embodiment of the measurement transducer of the invention, at least one of the components of the interconnected system has a tubular shape. In a further development of this embodiment of the invention, the at least one tubular component is embodied as an at least sectionally, straight, circularly cylindrical tube.

In a twenty-eighth embodiment of the measurement transducer of the invention, one of the components of the interconnected system is embodied as a measurement-transducer measuring-tube serving to convey the medium to be measured, vibrating during operation of the measurement transducer, especially executing, at, least at times, bending oscillations about an oscillation axis running in the direction of the longitudinal axis of the interconnected system and/or coinciding with the longitudinal axis of the interconnected system. In a further development of this embodiment of the invention, the first component is provided in the form of a measuring tube and the second component as a metal body, especially a plate-shaped or disk-shaped one, affixed to the measuring tube. In another further development of this embodiment of the invention, the second component is provided in the form of a measuring tube and the first component as a metal body, especially a plate-shaped or disk-shaped one, affixed to the measuring tube.

In a further development of the measurement transducer of the invention, the interconnected system further includes a third component, which is affixed to the first component and/or to the second component. In a first embodiment of this further development of the invention, the first component is bonded, in each case, at least sectionally, both with the second component and with the third component. In a second embodiment of this further development of the invention, the third component is made of a material, which differs with respect to at least one physical and/or chemical property, especially a melting temperature, a coefficient of thermal expansion and/or with respect to the modulus of elasticity, etc., from a material of the second component. In a third embodiment of this further development of the invention, the third component is arranged spaced from the first component and/or is embodied essentially identically to the first component. In a fourth embodiment of this further development of the invention, the first or the second component of the interconnected system is embodied as a measuring tube of the measurement transducer, for conveying the medium to be measured, vibrating during operation of the measurement transducer, and, especially, executing, at least at times, bending oscillations about an oscillation axis running in the direction of the longitudinal axis of the interconnected system and/or coinciding with the longitudinal axis of the interconnected system, and the third component is embodied as a support element of the measurement transducer affixed oscillatably to the measuring tube and/or holding the measuring tube oscillatably. In a fifth embodiment of this further embodiment of the invention, the third component is embodied as a transducer housing of the measurement transducer for encasing the measuring tube. In a sixth embodiment of this further embodiment of the invention, the third component is embodied as an, especially cylindrical, counteroscillator of the measurement transducer, encasing the measuring tube and extending essentially coaxially with the measuring tube. In a seventh embodiment of this further development of the invention, at least one of the three components of the interconnected system is embodied as a flange of the measurement transducer affixed to an end of the measuring tube and serving for connecting a line, in the form of a pipeline, to the measuring tube.

A basic idea of the invention is that one of the components of interconnected systems of the described kind is embodied itself as a composite, formed part, especially a sintered one. This makes possible the matching of its surfaces coming in contact with other components as well as possible, in each case, in its physical and/or chemical properties, to the physical and/or chemical properties of each of the other components which it contacts, so that the components are connectable together, without more, by bonding during the manufacture of the measurement transducer, even by means of welded connections. Moreover, the required high quality of the interconnected system, be it with respect to the material properties of the used components or with respect to the mechanical strength, can not only be increased, but also reproduced much more reliably.

A further advantage compared with conventional measurement transducers having such interconnected systems formed partially or entirely by means of bonding is that production is considerably simplified and production costs are also lowered. For example, the at least one, at least partially composite component can be sintered in-situ, thus at least in the final position and location, directly on the other component, and can be bonded therewith via a diffusion zone formed between the materials of the two components.

A further advantage of the invention is, additionally, that the interconnected system is especially suited also for the joining of a solid and relatively rigid component, such as e.g. a metal body serving as an end piece or coupling, with an, in comparison, easily deformable, relative thin-walled component, such as the measuring tube. As a result also of this, the pull-out strengths of the interconnected system of the invention can be kept, without more, and even after repeated oscillatory loading, above 50% of the originally present, comparatively high, starting pull-out strengths and, consequently, without more, even for longterm operation, above the minimum strengths required for measurement transducers of the described kind.

BRIEF DESCRIPTION OF THE DRAWINGS

The invention, as well as advantageous embodiments, will now be explained in greater detail with reference to the drawing, the figures of which show as follows.

DETAILED DESCRIPTION OF EXEMPLARY EMBODIMENTS

While the invention is susceptible to various modifications and alternative forms, exemplary embodiments thereof have been shown by way of example in the drawings and will herein be described in detail. It should be understood, however, that there is no intent to limit the invention to the particular forms diclosed, but on the contrary, the intention is to cover all modifications, equivalents, and alternatives falling within the spirit and scope of the invention as defined by the intended claims.

Figure 1:
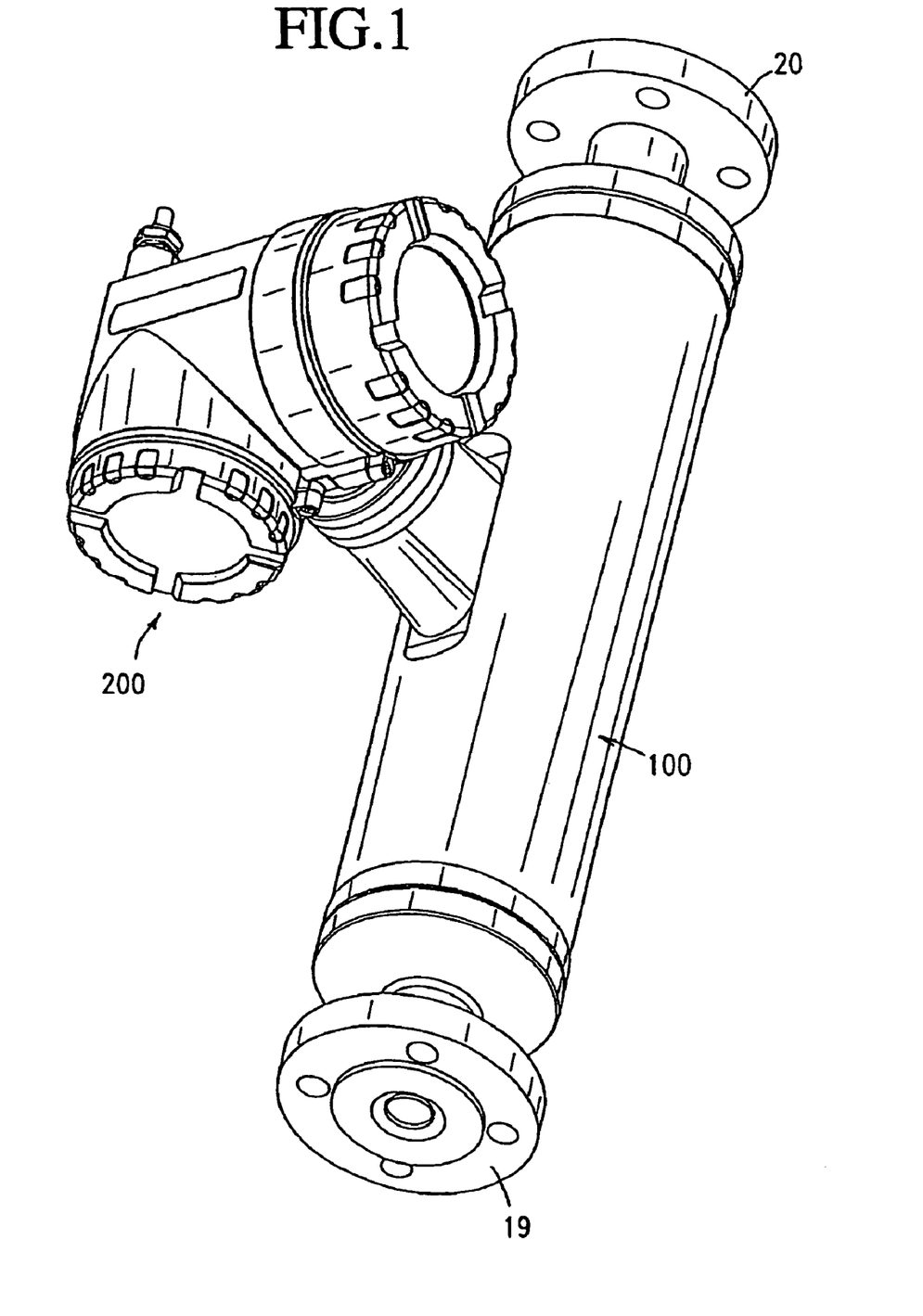
FIG. 1 in a perspective, side view, an inline measuring device.

FIG. 1 shows an inline measuring device, for example a Coriolis mass flow measuring device, a density measuring device, a viscosity measuring device, or the like, having a vibration-type measurement-transducer. Such device serves for measuring at least one flow-dynamic and/or rheological, measured variable of a medium conveyed in a line, for example a pipeline. The inline measuring device includes: A measurement transducer 100 accommodated in a transducer housing and serving for the registering of the measured variable; and a measuring device electronics 200 accommodated in an electronics housing and serving for, among other things, control of the measurement transducer and processing of its measurement signals.

Figure 2:
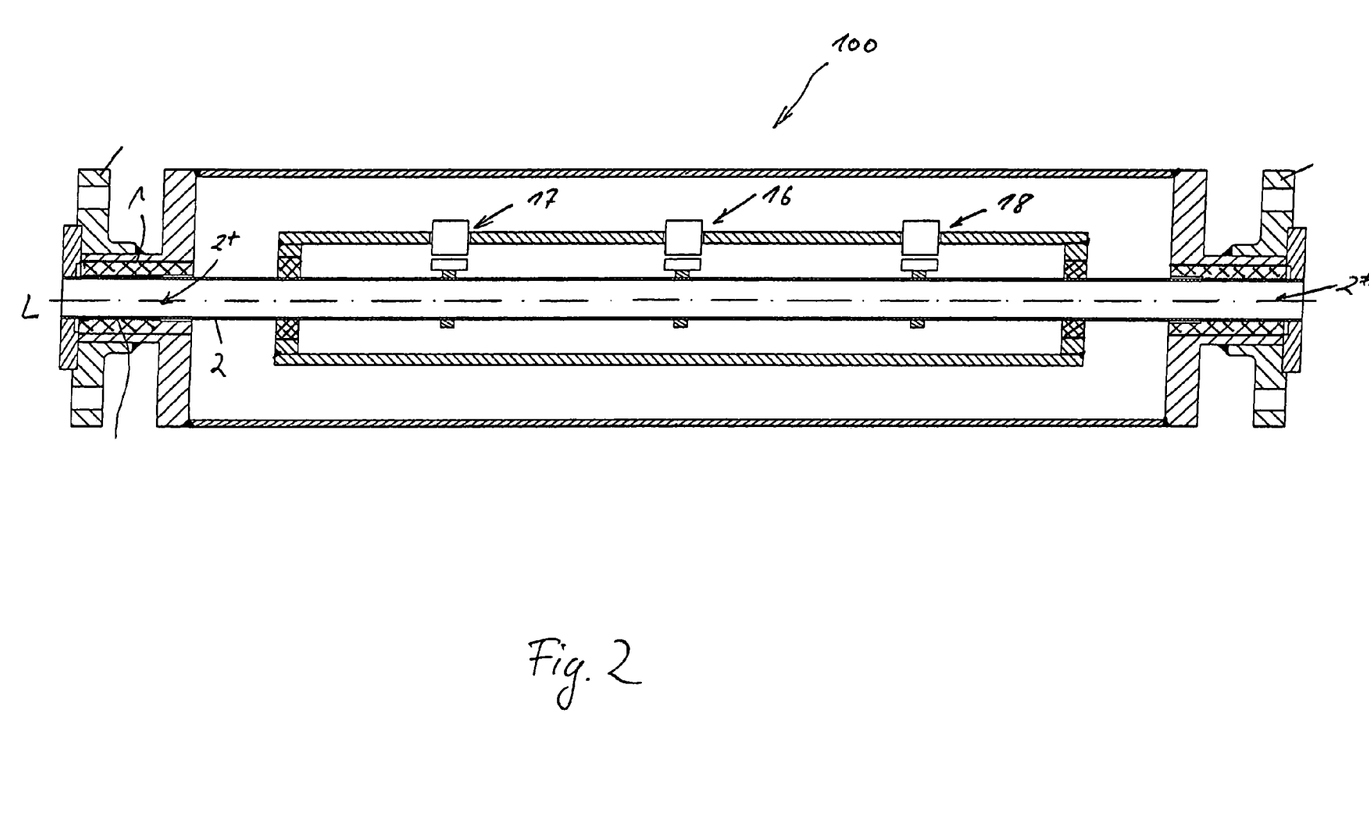
FIG. 2 in longitudinal section, a vibration-type measurement-transducer with at least two components united to form an interconnected system, suited for application in an inline measuring device as shown in FIG. 1, especially one embodied as a Coriolis mass-flow transducer.
Figure 3:
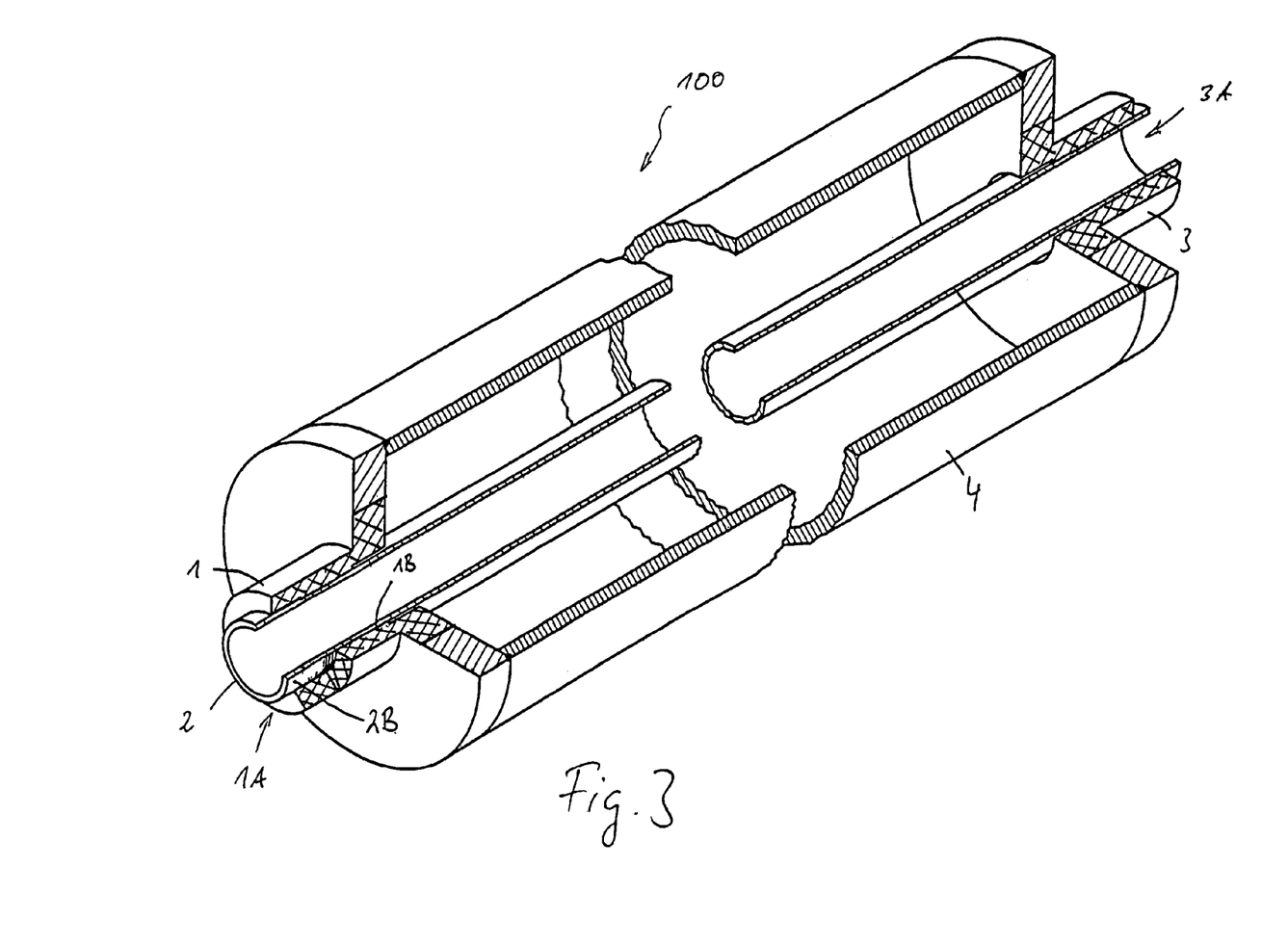
FIG. 3 perspectively and partially in section, a view of the length of a further vibration-type measurement-transducer built of interconnected systems of the described kind.

FIGS. 2 and 3 illustrate an example of an embodiment for a corresponding vibration-type measurement-transducer 100, for example one serving as a Coriolis mass flow, density and/or viscosity measurement transducer, for use in an inline measuring device serving for measuring a medium flowing at least at times. In use, the inline measuring device is inserted, by means of the measurement transducer 100, into the course of a pipeline (not shown), through which a fluid to be measured flows, so that the measurement transducer is, during measurement operation, flowed-through, at least at times, by the medium to be measured. Only the details of the measurement transducer essential for explaining the invention are shown here; the remaining components required for full functioning of the measurement transducer, or inline measurement device, are not shown, since such would tend to clutter the presentation. Additionally, the construction, functioning, and areas of application for such measurement transducers, or inline measuring devices, are known per se to those skilled in the art; the above-listed references to the state of the art are incorporated here by reference in this regard.

The measurement transducer 100 of the invention includes at least one interconnected system, especially a bi-metal, or poly-metal, one, formed, at least, of a first component 1 and a second component 2 of the measurement transducer. In an embodiment of the invention, the at least two components of the interconnected system are so embodied and affixed together, that an inner of the two components extends, at least partially, through the other, outer component, along an imaginary longitudinal axis L of the interconnected system. The inner component has, in such case, an at least partially curved (especially in the form of a cylindrical surface) outer surface, which contacts an inner surface of the outer component flushly in such a manner that the outer component grips around the inner component, at least sectionally, at least partially. By way of example, the inner surface of the outer, first component can, in such case, be formed by an inner wall of a bore extending at least into a portion of the outer component, while the outer surface of the inner, second component is formed by an outer wall of the second component.

In the present example of an embodiment, the interconnected system is formed, in part, by a measuring tube of the measurement transducer 100. The measuring tube functions, for practical purposes, as inner component 2 of the interconnected system. Affixed to this base, the interconnected system includes other components of the measurement transducer 100, for example a metal body of the above-described kind, pushed onto the measuring tube or onto one of its terminal extensions, and affixed thereto. The measuring tube is, as already indicated, provided for insertion into the course of a pipeline, through which a medium to be measured flows, e.g. a liquid or a gas, and is so connected fluid-conveyingly therewith, that the fluid to be measured can, during operation of the corresponding measurement transducer, also flow through the measuring tube. To this end, corresponding flanges 19, 20 are provided, which are connected with the measuring tube or with endpieces extending such, via an, in each case, short tube-piece, into which an inlet end 2+ and an outlet end 2#, as the case may be, of the measuring tube illustrated here extends. Instead of the flanges, the measurement transducer can also be connected to the pipeline by means of other usual securement means, such as, for example, so-called TriClamp (R) connections or also connections utilizing screw threads. In the illustrated example of an embodiment, the inner surface of the first component 1 serving as the first connecting surface of the interconnected system is formed by an inner wall of the bore 1A extending, in this case, all the way through the first endpiece, while the outer surface 2B of the second component 2 serving as second connecting surface 2B of the interconnected system is formed by an outer wall of the measuring tube.

As is quite usual in the case of such measurement transducers, it is provided in one embodiment of the invention that at least one of the two components 1, 2, especially the measuring tube, is made, at least partially, of at least one metal, or that the first component and the second component are each made, at least partially, of metal. Serving as material for the at least one metal component can be, for example, steel, especially high grade steel and/or stainless steel, titanium, tantalum, as well as zirconium, or also a metal alloy composed of at least one of the aforementioned, highly corrosion resistant metals.

For producing reaction forces corresponding to a physical, measured variable, e.g. a mass flow, density and/or viscosity of the fluid, and, to such extent, describing the fluid, e.g. Coriolis forces correlated with mass flow, or frictional forces correlated with viscosity, the measuring tube is caused during operation to vibrate, at least at times—driven by an electromechanical, oscillation exciter interacting therewith. According to an embodiment of the invention, the measuring tube serving to convey the medium to be measured is, in such case, so excited, that it executes, at least at times, bending oscillations about an oscillation axis imaginarily connecting the two tube segments, running in the direction of the mentioned longitudinal axis of the interconnected system and/or coinciding with the longitudinal axis of the interconnected system. The oscillation exciter 16 can be selected from the different types of oscillation exciters described for this purpose in the state of the art of such measurement transducers, especially those used as Coriolis mass flow transducers. By means of the oscillation exciter 16, the measuring tube 13 may excited during operation preferably to those bending oscillations whose oscillation frequency is essentially equal to an instantaneous, mechanical eigenfrequency of the measuring tube with fluid conveyed therein. For registering vibrations of the measuring tube and for producing vibration signals corresponding therewith, oscillation sensors can be placed in the vicinity of the measuring tube, in manner known to those skilled in the art. In FIG. 2, for example, a first sensor 17 and a second sensor 18 are provided, respectively, for the inlet and outlet movements of the measuring tube, of which each is arranged, in each case, between the halfway point along the length of the measuring tube and, respectively, the inlet and the outlet end pieces, and, indeed, at about equal distances. In the example of an embodiment shown in FIG. 1, there is located, on the measuring tube, at the location of each sensor, additionally an approximately circular ring-shaped, or circular disk-shaped, metal body, which interacts with the sensor 17, 18. Serving as sensors 17, 18 can be the different types of sensors described for this purpose in the state of the art of such vibration-type measurement-transducers, especially those used as Coriolis mass flow transducers, such as e.g. electrodynamically, or optically, operating, distance, velocity or acceleration sensors.

As additionally shown in FIG. 2, or FIG. 3, as the case may be, a second tube segment of the measuring tube, especially a second tube segment formed essentially identically to the first tube segment, is inserted into a bore 3A of a second end piece of the measurement transducer 100, especially a second end piece formed essentially identically to the first end piece. In an embodiment of the invention, the second tube segment and the second end piece are connected together in the same manner as the first tube segment is connected with the first end piece 11. The first end piece and the second end piece, here functioning essentially likewise as a component of the interconnected system, are additionally completed by means of at least one laterally arranged, for example mounted-on or welded on, support plate or an essentially cylindrical support tube 4, to become a support element oscillatably holding the at least one measuring tube. This support element is, to such extent, thus also to be considered as a further component of the interconnected system. Instead of the cylindrical support tube, however, also a more box-shaped component can, for example, be used for the support element. Examples for the construction and functioning of such support elements can be taken from, among others, the already above mentioned U.S. Pat. Nos. 4,823,614, 5,253,533, 5,705,754, 5,796,011, 6,006,609, 6,047,457, 6,168,069, 6,314,820, 6,397,685, 6,487,917, 6,516,674, 6,691,583, 6,666,098, 6,698,644, 6,711,958, 6,851,353, or WO-A 03/048693.

Figure 4:
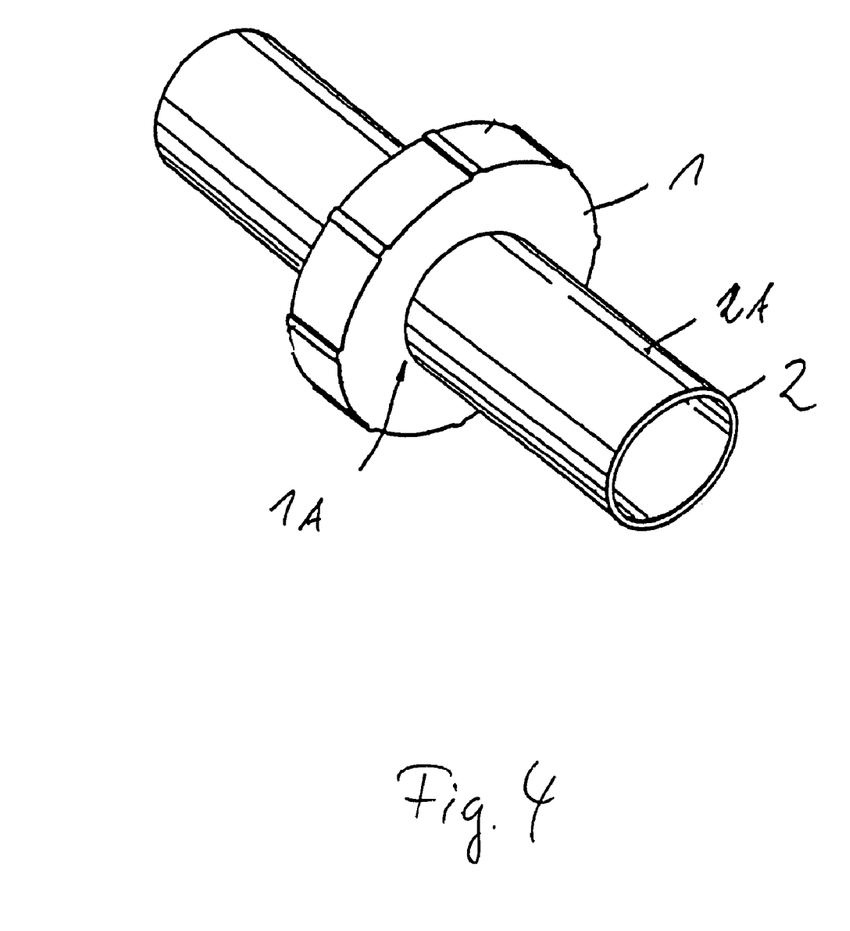
FIG. 4 perspectively, a circular, washer-shaped metal body serving as the first component of the interconnected system of FIG. 2, mounted on an only partially shown, circularly cylindrical measuring tube serving as the second component of the interconnected system of FIG. 2 in the case of a vibration-type measurement-transducer.

It is to be mentioned here, additionally, that, instead of the outer component 1 formed in the example of an embodiment as an end piece and, to such extent being more sleeve-, or tube-, shaped, also a ring-shaped, plate-, or even disk-, shaped metal body can serve as outer component 1 of the interconnected system; compare, in this respect, also FIG. 4. Besides the examples of embodiments for component 1 shown in FIG. 2, 3 or 4, having essentially circular outer contours, it is also possible to use components having a non-circular outer contour, for example in the manner of a hexagonal nut, a square disk, or even in the manner shown in U.S. Pat. No. 6,047,457, having a lateral appendage, etc. Accordingly, a further embodiment of the invention provides a component 1 in the form of a metal body, which has a bore and a corresponding inner surface fitting the outer peripheral surface 2A of the inner component 2 embodied as a measuring tube and which is correspondingly affixed on the outer peripheral surface 2A of the measuring tube for forming the interconnected system. The component 1 of FIG. 4, embodied in the form of a ring-, or washer-, shaped, metal body can, as already indicated, serve as a securement for one of the already mentioned oscillation sensors or the oscillation exciter or, however, even, as proposed in WO-A 03/027616, as a stiffening element stabilizing the cross section of the measuring tube also in the case of pressure fluctuations.

According to the invention, it is further provided that at least one of the at least two components of the interconnected system—for example, the measuring tube and/or the discussed, metal body—is embodied as a composite, formed part of chemically and/or physically different materials. Accordingly, as also schematically indicated in FIG. 2, 3 or 5, at least one of the components of the interconnected system, for example the outer component 1, is made of at least two materials, which differ from one another with respect to at least one material property, especially a physical and/or chemical property. In the case of the at least one material property distinguishing the two materials, such can be e.g. an internal material structure, a material density, a melting temperature, a coefficient of thermal expansion, a tensile strength and/or a modulus of elasticity of each of the two materials. In other words, the composite component 1, to the extent that it is embodied as a multicomponent system, is made of at least two chemically different materials and/or the composite component 1, to the extent that it is embodied as an inhomogeneous, multiphase system, is made of at least two materials which are different with respect to their internal structures, especially their microstructures. In an embodiment of the invention, the at least one of the two materials of the composite component 1 is a metal, for example, steel, titanium, zirconium, or, as required, an even nobler metal, such as tantalum, gold or platinum. In a further development of this embodiment of the invention, each of the at least two, mutually differing materials of the composite component is a metal. For example, the materials used for the composite component 1 are mutually differing types of steel.

In the case of the measurement transducer 100 shown by way of example in FIGS. 2 and 3, the outer component 1 of the interconnected system embodied as a composite component can be, for example, a first end piece of a transducer housing encasing the measuring tube. The first end piece contains a bore provided therein. The bore receives a straight, essentially circularly cylindrical, first tube segment at the inlet end of the here only partially illustrated measuring tube of the measurement transducer. Equally, the aforementioned metal body can also be embodied as a composite component. Alternatively or in supplementation thereof, also the measuring tube itself, thus the second component 2, can be a composite component.

By the combining of the at least two different materials (metals) in the at least one composite component, it becomes possible to match its properties well to the chemical and/or physical properties of the other component of the interconnected system affixed thereto, as well as also, in corresponding manner to chemical and/or physical properties of other components possibly provided in the interconnected system. In a suitable combination of the at least two materials of the component 1—here the at least two metals—along with a suitable choice of the material or materials for the second component therefor, it becomes possible, also, without more, to produce a bonded, especially a soldered, brazed, and/or welded, connection between the two components 1, 2; compare, in this respect, also FIG. 2, 3 or 5. For example, in this way, a component made partially of steel can be soldered, brazed or welded to a component partially of titanium and/or zirconium and/or tantalum, to the extent that the mutually contacting, connecting surfaces of the two components are, in each case, made of a material which is compatible, from a welding, soldering or brazing point of view, with the contacting material of the other component. As a result of this, with suitable selection of the materials used for the components for the interconnected system of the invention, it is possible, in very simple manner, to obtain, longterm, a very high mechanical strength, especially even when subjected to mid-, or high-, frequency, alternating forces related to operation, whereby the interconnected system of the invention is very well suited for application in the case of vibration-type measurement-transducers. Moreover, in this way, even a measuring tube manufactured of titanium can, with the interposition of the composite component 1, be bonded right through, without more, also to a support-tube, or support-box, of steel, particularly high grade steel and/or stainless steel (see below). In an embodiment of the invention, therefore, at least one of the at least two materials of the composite component 1 is so selected that this material is essentially equal, as regards at least one physical and/or chemical property, to a material of the component 2 of the interconnected system affixed thereto. In advantageous manner, in such case, at least one of the materials of the composite component is so selected that it is essentially completely equal to a material of the other component of the interconnected system affixed to the composite component.

Figure 5:
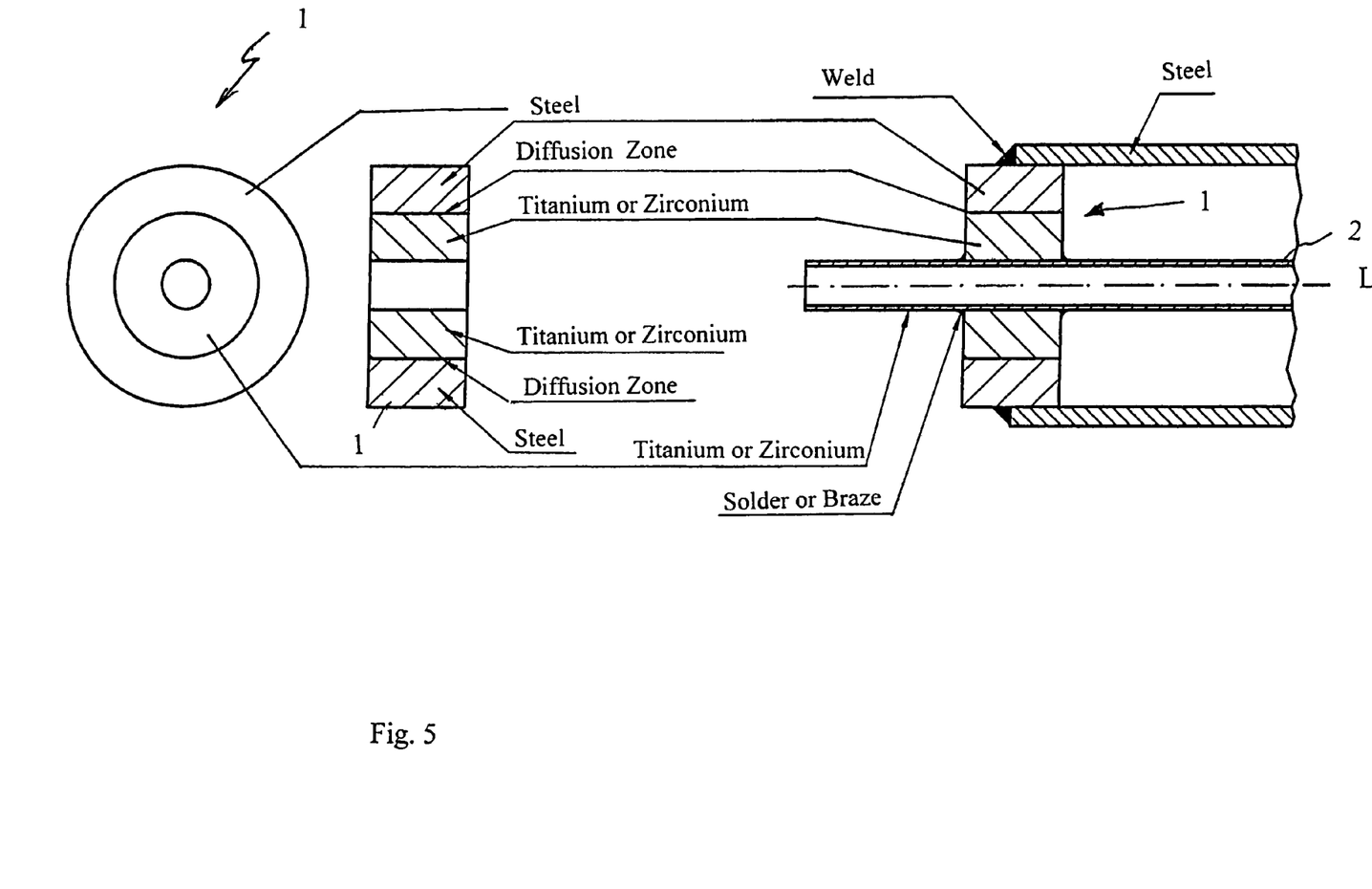
FIG. 5 in section, a view of the length of a composite component suited for building the interconnected system of the described kind and made of at least two materials.

In order to achieve as stable and permanent a connection as possible between the materials of the composite component, especially also in the case of increased mechanical loading, and, consequently, to be able to assure also a high, longterm strength of the composite component, an embodiment provides that the composite component 1 is, as also shown schematically in FIG. 2, 3 or 5, built-up in layers of the at least two mutually differing materials. In advantageous manner, in such case, each of the at least two materials has a layer thickness of at least 1 mm. In a further development of the invention, it is additionally provided that each of the at least two mutually differing materials of the composite component 1 forms, in each case, at least 1%, especially more than 10%, of the volume of the composite component.

In another embodiment of the invention, each of the at least two materials of the first component 1 is a metal. In a further development of this embodiment of the invention, the first component 1 is made, in such case, at least partially of steel and at least partially of titanium and/or zirconium and/or tantalum and/or another metal, especially another metal nobler than steel.

In a further development of the invention, the at least two components 1, 2 of the interconnected system are bonded together at least sectionally, especially by means of a soldered, brazed and/or welded connection. For manufacturing the interconnected system, the first component—for example, thus, the aforementioned end piece—can be brought together with the second component 2—for example, thus, the measuring tube—in a manner such that the second component 2 extends at least partially through the bore 1A formed in the first component 1, in the direction of the longitudinal axis L of the interconnected system. Then, following this, both components can be welded, soldered or brazed together. In another further development of the invention, the two components 1, 2 of the interconnected system are bonded together via a diffusion zone in a contact area between the two components, for example by diffusion welding and/or by a sintering process; if required, additionally applied solder, braze or weld connections can improve the strength of the interconnected system still further.

Alternatively to, or in supplementation of, the bonding of at least the two components of the interconnected system, the two components, as well as their mutually contacting surfaces, are, in a further development of the invention, so developed and so formed that the two components 1, 2 are, as also proposed in U.S. Pat. Nos. 6,598,281, 6,519,828, 6,047,457, 5,610,342, WO-A 03/048693 or the above-mentioned German Patent Applications DE102004048765.0 or DE10354373.2, also connected together mechanically and securely by the formation of a frictional interlocking. Additionally, the surfaces of the components 1, 2 are so formed, that the frictional interlocking produced on them acts also in a peripheral direction of the outer surface of the second component 2. This is, in the case of this embodiment of the interconnected system of the invention, achieved by providing clamping forces, especially normal forces directed radially to the longitudinal axis 2, acting on the connecting surfaces 1B, 2B formed by the mutually contacting surfaces of the two components 1, 2, such that at least one of the two components of the interconnected system is at least partially, lastingly elastically deformed. These normal forces are produced in an embodiment of the invention, at least partially, by deforming at least one of the two components 1, 2 mixed elastically-plastically, thus such that it exhibits both plastically deformed regions, which have been introduced therein by extension or compression of the affected component, as well as lastingly elastically deformed regions resulting therefrom. The two components 1, 2 of the interconnected system form, thus, at least partially, a press joint, especially one acting in the direction of the longitudinal axis L and/or in a peripheral direction of the outer surface of the second component 2.

In a further embodiment of the invention, at least one of the at least two materials of the component 1 is sintered, i.e. component 1 is composed at least partially of sintered material. To such extent, the composite component 1 in this embodiment of the invention is a sintered part, or an at least partially sintered component. Due to the diffusion zones formed thereby in the interior of component 1 between the separate crystals and/or particles of the two materials, a lasting, high-strength, at least partially bonded connection is formed therebetween, despite the chemical/physical differences of the two materials; compare FIGS. 5 and 6.

Figure 6:
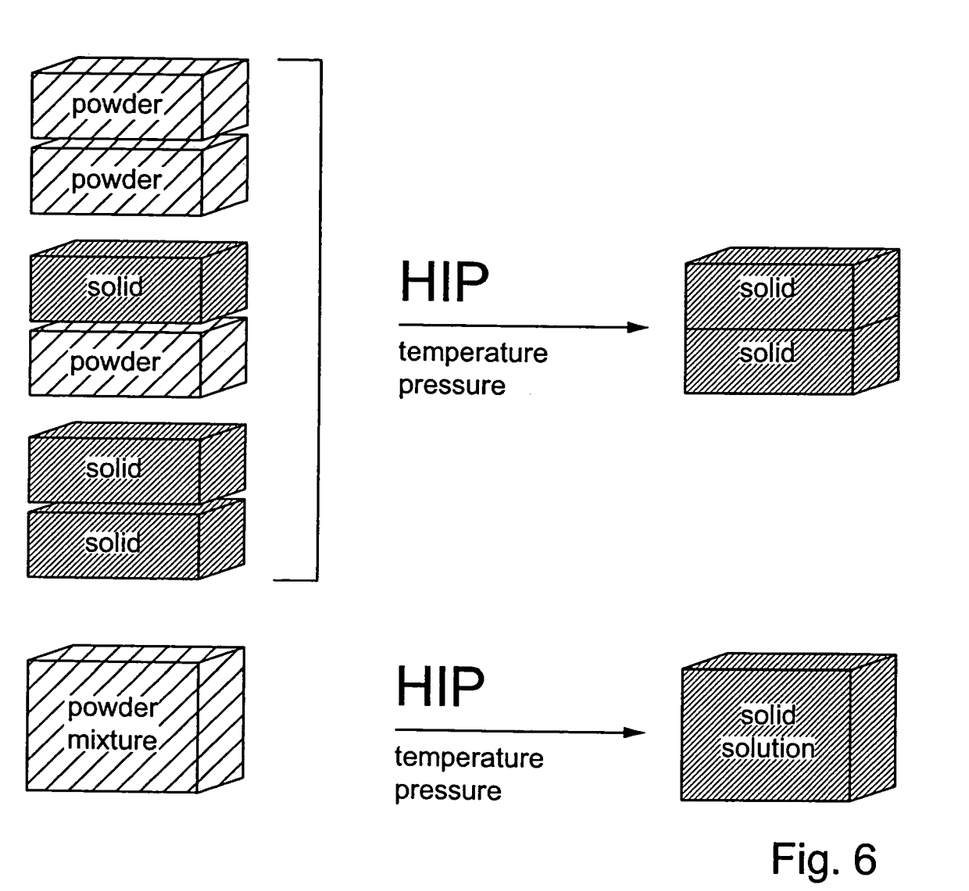
FIG. 6 schematically illustrated variants and alternatives for producing a composite component of the described kind.

As a result of this, on the one hand, an optimum matching of the chemical/physical properties of the first component to those of the second component 2 connected therewith can occur. On the other had, in this way, also a very high mechanical stability of the thus manufactured component 1, and, to such extent, also of the interconnected system itself, can be achieved. For manufacturing the at least one at least partially sintered component 1, pourable, thus granular and/or powdered, sinter starting material is suitably charged into a corresponding sintering mold and then, with application of heat, if required also under vacuum, appropriately sintered; compare, in this connection, also FIG. 6. As schematically illustrated in FIG. 6, several powders and/or granulate could used as sinter starting materials, which may laminate and/or mix and/or apply on solid surfaces.

The sintering can occur, in such case, for example, in a corresponding sintering oven, or in an autoclave. In a further embodiment of the invention, the sintering mold is, in such case, formed, at least partially, by at least one, for example tubular, intermediate, which, following the sintering, for example due to diffusion between the separate materials and/or phases, becomes an integral part of the first component 1. Accordingly, this intermediate can be made, at least partially, also of at least one of the materials provided for the component. The intermediate used therefor can be e.g. a drawn, rolled or cast intermediate, so that, thus, at least for this case, the component 1 can be made, at least partially, also of a cast and/or rolled and/or drawn material. Equally, the intermediate serving as sintering mold can itself be sintered.

In another embodiment of the invention, the sintering mold is formed at least partially by the at least partially prefabricated second component. In a further development of this embodiment of the invention, the first component 1 is sintered essentially directly onto the other component. Consequently, on the one hand, both components 1, 2 of the interconnected system can, in simple manner, be fitted to one another, especially in their contact areas. On the other hand, by suitable selection of the materials used for the individual components 1, 2, or for their manufacture, as well as by corresponding calibration of the sintering process, it can be obtained that, as a result of diffusion phenomena also in the contact region between the form-giving, second component 2 and the sinter material for the first component 1, a secure connection between the two components 1, 2, and, to such extent, the interconnected system, can be formed already during manufacture of the first component, at least partially, already by the sintering. For example, the at least one, at least partially sintered composite component can thus, in advantageous manner, be sintered in-situ, thus at least in the final position and location, if required also in the final shape, directly onto the other component and bonded with this via a diffusion zone formed between the materials of both components. In other words, both one of the components can be embodied per se and also the entire interconnected system can be embodied, as a sinter-molded part.

In another embodiment of the invention, at least the first component 1 is produced, at least partially, be means of hot pressing. Advantageously, the sintering of the component occurs at least partially by means of hot isostatic pressing (HIP) and, to such extent, component 1 is embodied as a hipped component. In a further development of this embodiment of the invention, the sintering is done at a high working pressure of over 800 bar and/or a high working temperature of over 700° C., wherein working pressure and working temperature can, in concrete cases of application, be so adjusted, that a desired density and/or porosity is achieved for the composite component. In an embodiment of the invention, a degree of porosity of the composite component, thus a volume fraction, which determines the totality of all pores of the composite component, is selected to be smaller than 10%, especially essentially smaller than 5%.

Figure 7:
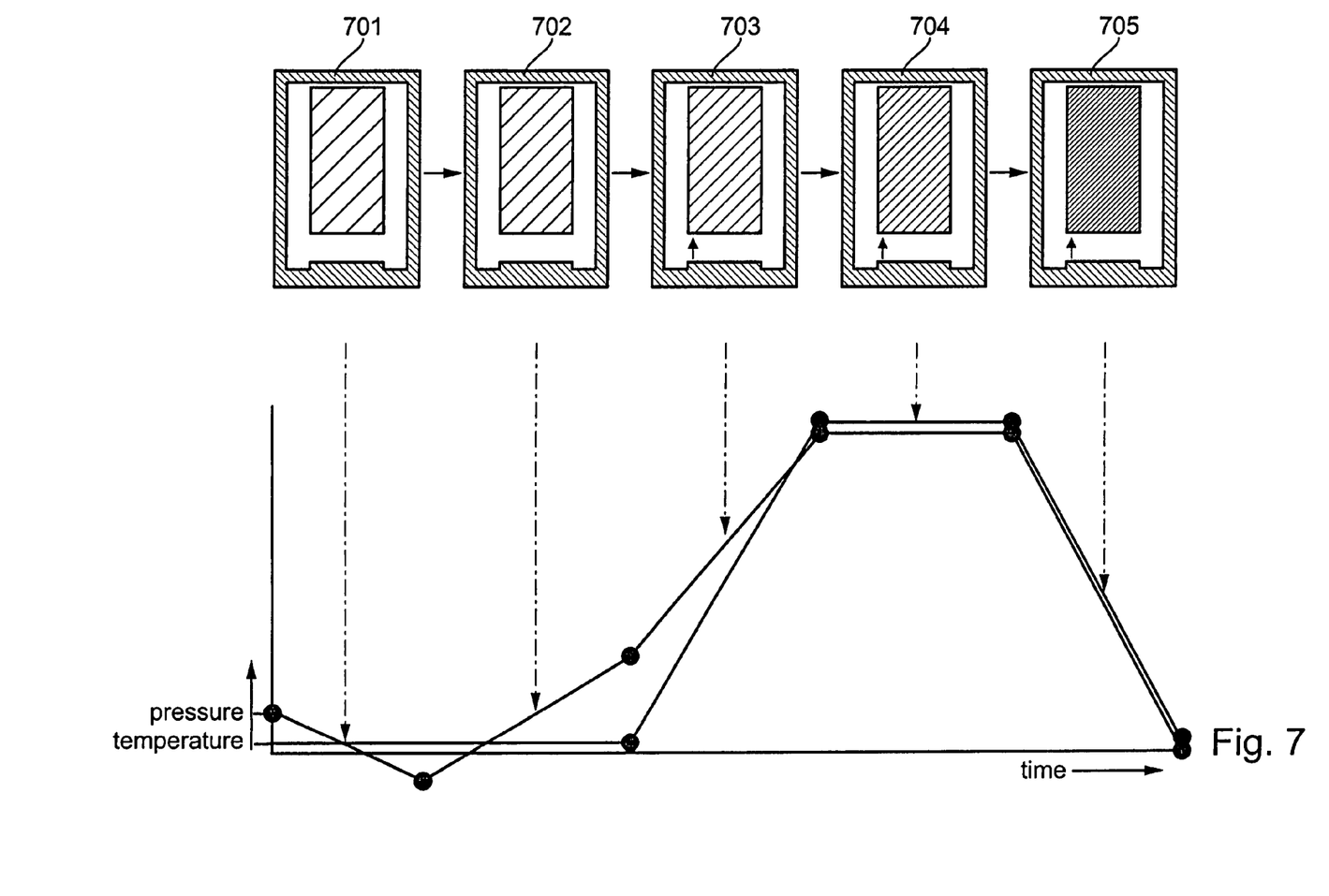
FIG. 7 schematically illustrated, separate method steps for producing a sintered composite component of the described kind.

In a further development of this embodiment of the invention, the sintering is done in a sintering oven equipped for controlled atmospheric pressure, into whose firing chamber first the two materials for the composite component 1 are brought, (FIG. 7 701). Then, the firing chamber is evacuated, in order thereafter to be charged with an inert, protective gas, for example argon, NH3-cracked-gas, methane, coal gas, etc, so that an atmospheric pressure of 300 bar or more is built-up in the firing chamber; (FIG. 7, 702). By heating of the firing chamber to over 700° C., the atmosphere pressure in the firing chamber is increased to far above 800 bar, for example about 1400 bar (FIG. 7, 703). The working temperature finally obtained in the firing chamber and the atmosphere pressure existing in such case are held at a level as constant as possible for a predeterminable holding time, especially a holding time which has been previously experimentally determined, so that the applied materials adhere well to one another at the end (FIG. 7, 704). Following expiration of the holding time, working pressure and temperature are then reduced in suitable manner with earlier appropriately determined time curves (FIG. 7, 705).

In a further embodiment of the invention, the at least two materials used for the component 1 are essentially equal, or at least similar, to one another with respect to a material property, such as e.g. the already mentioned melting temperature, tensile strength and/or modulus of elasticity.

In an advantageous further development of the invention, it is additionally provided that the interconnected system additionally includes at least also a third component 3, which is affixed, especially bonded, to the first component 1 and/or to the second component 2. For example, as already mentioned, one of the components 1, 2 of the interconnected system can be a metal body, which is pushed onto the other component serving as the measuring tube of the measurement transducer and there itself affixed, while the third component 3 is embodied as a support element—for example a support tube—of the measurement transducer, which is coupled to the measuring tube by means of the metal body serving, to such extent, as first coupler, and, as required, another, second coupler separated from the first one; compare, in this connection, also the already mentioned U.S. Pat. Nos. 6,851,323, 6,519,828, or 6,598,281, 6,047,457. In an advantageous embodiment of this further development of the invention, the measuring tube is, as already mentioned, made predominantly of titanium, tantalum or zirconium, while the support element is made predominantly of steel, e.g. high grade steel and/or stainless steel. Additionally, the composite component 1 is, in such case, partially built of steel and, to an appropriate degree, of titanium, tantalum or zirconium, or at least of a material bondable with the measuring tube, so that the composite component 1 can be soldered, brazed and/or welded both with the second component embodied here as the measuring tube, as well as with the third component embodied here as the support tube. In this respect, the third component 3 thus is made of a material, which differs with respect to at least one physical and/or chemical property, especially a melting temperature, coefficient of thermal expansion and/or modulus of elasticity, etc. from a material of the second component 2. Equally, the third component 3 can, moreover, be made of a material, which is equal with respect to at least one physical and/or chemical property, especially a melting temperature and/or a coefficient of thermal expansion, to the material of the second component 2, at least such that it can be bonded with the second component 2 by way of the materials sufficiently equaling one another. Accordingly, in a further embodiment of this further development of the invention, the first component 1 is bonded, in each case at least sectionally, both with the second component 2 as well as also with the third component 3, for example by soldering, brazing or welding.

It is to be noted here that, especially in the case of using only a single measuring tube in the measurement transducer 100, the aforementioned support element serves both for holding the measuring tube, exciter mechanism and sensor arrangement, as well as also functioning as counteroscillator for the measuring tube, in order to cancel, or at least lessen, possible disturbance oscillations during operation. Accordingly, in an embodiment of this further development of the invention, it is provided that the third component 3 is in the form of a counteroscillator of the measurement transducer, encasing the measuring tube, especially cylindrically, and extending essentially coaxially with the measuring tube. In another embodiment of the aforementioned further development, the third component is also embodied as the already mentioned transducer housing of the measurement transducer housing 100, affixed on the ends to the measuring tube and encasing such. As well, also the above-mentioned, second coupler or also one of the above-mentioned flanges can, in each case, be considered to be the third component 3 of the interconnected system, in which case such is arranged spaced from the first component and embodied essentially identically to the first component 1.

As is evident from the totality of the above explanations, an advantage of the invention is to be seen especially in the fact that it is suitable for application to components of vibration-type measurement-transducers, wherein the components are made of different materials, and the components differ from one another, as regards material, in the fact that they would not be capable of being welded together in conventional manner, and, if, perhaps, then only with complex manufacturing precautions. Thus, by using the present invention, a pull-out strength of the interconnected system can be significantly improved, as compared the conventional vibration-type measurement-transducers, so that also a longterm strength of the interconnected system is significantly improved.

Besides maximizing the pull-out strength of the interconnected system, also the vibration resistance, and thus also a maximum possible, or allowable, number of cycles until fatigue failure, can be increased for the measuring tube. Once knowing of the invention and, with the background of the state of the art cited above, especially U.S. Pat. Nos. 5,610,342, 6,047,457, 6,168,069, 6,519,828, 6,598,281 or WO-A 03/048693, there exists for those skilled in the art no difficulty in determining the materials for the components, suitable for a given application, as well as the optimum parameters, be it with respect to actual dimensioning of the components of the interconnected system or also with respect to adjusting of the tools and machines used for the manufacture. Equally, there exists for those skilled in the art also no difficulty in adapting the method of the invention to concrete requirements for the durability of the interconnected system and in optimizing the method of the invention with respect to flow of the manufacturing process.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A measurement transducer of the vibration-type, for a measuring device serving for measuring a medium flowing in a line, comprising:
    at least one interconnected system formed by means of at least a first component and by means of at least a second component,
    at least said first component of the interconnected system is embodied as a composite, formed partly of at least two materials, which differ from one another with respect to at least one physical and/or with respect to at least one chemical property, wherein:
    each of said at least two mutually differing materials of said first component forms, in each case, at least 1% of the volume of the component; and/or
    said first component is built up in layers of the at least two mutually differing materials, each of the two materials has a layer-thickness of at least 1mm; and/or
    a degree of porosity of the composite component is selected to be smaller than 10%; and/or
    at least one of said components is subjected, at least partially, lastingly, to elastic deformations.

2. The measurement transducer as claimed in claim 1, wherein: each of said at least two mutually differing materials of said first component forms, in each case more than 10%, of the volume of the component; and/or a degree of porosity of the composite component is selected to be smaller than 5%.

3. The measurement transducer as claimed in claim 1, wherein:
    at least one of said at least two materials of said first component is, with respect to at least one physical and/or chemical property, essentially equal to a material of said second component; and/or
    each of said at least two materials of said first component comprises a metal; and/or
    at least said first component is made at least partly of material selected from a group consisting of: a cast materials, rolled material, and drawn material.

4. The measurement transducer as claimed in claim 1, wherein:
    at least one of the components at least partially comprises a metal.

5. The measurement transducer as claimed in claim 4, wherein: both said first component and said second component each at least partially comprise metal.

6. The measurement transducer as claimed in claim 1, wherein:
    at least one of the components at least partially comprises steel and/or
    at least one of the components at least partially comprises titanium and/or
    at least one of the components at least partially comprises tantalum and/or
    at least one of the components at least partially comprises zirconium and/or
    said first component at least partially comprises steel and at least partially comprises titanium and/or zirconium and/or tantalum.

7. The measurement transducer as claimed in claim 1, wherein:
    said two components of said interconnected system are bonded together, at least sectionally.

8. The measurement transducer as claimed in claim 7, wherein:

said two components of said interconnected system are connected together, at least sectionally, by means of a solder, braze and/or weld connection; and/or said two components of said interconnected system are connected together, at least sectionally, via a diffusion zone.

9. The measurement transducer as claimed in claim 1, wherein;

said first component is sintered directly onto said second component, accompanied by the formation of a diffusion zone.

10. The measurement transducer as claimed in claim 1, wherein:

said two components of said interconnected system are connected together, at least sectionally, adhesively.

11. The measurement transducer as claimed in claim 1, wherein:

one of said two components of said interconnected system extends, at least partially, through the other component along an imaginary longitudinal axis of the composite system; and/or one of said at least two components of said interconnected system grips around the other of said at least two components, at least sectionally, at least partially.

12. The measurement transducer as claimed in claim 1, wherein:

one of said at least two components of said interconnected system flushly contacts, with an at least partially curved outer surface, an inner surface of the other of said at least two components of said interconnected system.

13. The measurement transducer as claimed in claim 1, wherein:

at least one of said components of said interconnected system is embodied in ring-shape; an/or at least one of said components of said interconnected system is embodied in sleeve-shape.

14. The measurement transducer as claimed in claim 1, wherein:

at least one of said components of said interconnected system is embodied tubularly.

15. The measurement transducer as claimed in claim 14, wherein:

said at least one component is embodied as an at least sectionally straight, circularly cylindrical tube.

16. The measurement transducer as claimed in claim 1, wherein:

said interconnected system further includes a third component, which is affixed to said first component and/or to said second component.

17. The measurement transducer as claimed in claim 16, wherein:

said first component is bonded, in each case, at least sectionally, with said second component and also with the third component; and/or said third component comprises a material differing with respect to at least one physical and/or chemical property from a material of said second component; and/or said third component is arranged spaced from said first component and/or is embodied essentially identically to said first component.

18. The measurement transducer as claimed in claim 17, wherein:

one of said components of said interconnected system is embodied as a measuring tube of the measurement transducer, serving for conveying the medium to be measured, vibrating during operation of the measurement transducer, and executing, at least at times, bending oscillations about an oscillation axis, which extends in the direction of the longitudinal axis of said interconnected system and/or which coincides with the longitudinal axis of said interconnected system;

said third component is embodied as a support element of the measurement transducer affixed oscillatably on the measuring tube and/or holding the measuring tube oscillatably, or is embodied in the form of a transducer housing of the measurement transducer, for encasing the measuring tube, or is embodied as a counteroscillator of the measurement transducer, said counteroscillator encasing the measuring tube.

19. The measurement transducer as claimed in claim 1, wherein:

one of said components of said interconnected system is embodied as a measuring tube of the measurement transducer, serving for conveying the medium to be measured, vibrating during operation of the measurement transducer, and especially executing, at least at times, bending oscillations about an oscillation axis extending in the direction of the longitudinal axis of said interconnected system and/or coinciding with the longitudinal axis of said interconnected system.

20. The measurement transducer as claimed in claim 1, wherein:

at least one of said components of said interconnected system is embodied as a flange of the measurement transducer; and said flange is affixed to an end of the measuring tube and serves for connecting a line, in the form of a pipeline, to the measuring tube.

21. The measurement transducer as claimed in claim 19, wherein:

said first component is embodied as a measuring tube and said second component is embodied as a metal body affixed to the measuring tube, or said second component is embodied as a measuring tube and said first component is embodied as a metal body especially affixed to the measuring tube.

22. A measurement transducer of the vibration-type, for a measuring device serving for measuring a medium flowing in a line, comprising:

at least one interconnected system formed by means of at least a first component and by means of at least a second component; and at least said first component of the interconnected system is embodied as a composite, formed partly of at least two materials, which differ from one another with respect to at least one physical and/or with respect to at least one chemical property, wherein:

said at least two materials of said first component are at least partially bonded together via a diffusion zone formed at least sectionally in said interior of the first component; and/or at least said first component of the interconnected system comprises, at least partially, sintered material; and/or at least the first component is produced at least partially by means of hot pressing.

23. A measurement transducer of the vibration-type, for a measuring device serving for measuring a medium flowing in a line, comprising:

at least one interconnected system formed by means of at least a first component and by means of at least a second component, and;

at least said first component of the interconnected system is embodied as a composite, formed partly of at least two materials, which differ from one another with respect to at least one physical and/or with respect to at least one chemical property, wherein:

at least said first component is produced at least partially by means of hot isostatic pressing performed at a high working pressure of over 800 bar and/or performed at a high working temperature of over 700° C.

24. A measurement transducer of the vibration-type, for a measuring device serving for measuring a medium flowing in a line, comprising:

at least one interconnected system formed by means of at least a first component and by means of at least a second component, one of said at least two components of said interconnected system flushly contacts, with an at least partially curved outer surface; and an inner surface of the other of said at least two components of said interconnected system, and at least said first component of the interconnected system is embodied as a composite, formed partly of at least two materials, which differ from one another with respect to at least one physical and/or with respect to at least one chemical property, wherein;

said inner surface is formed by an inner wall of a bore extending into at least a portion of the pertinent component; and/or said two components of said interconnected system form, at least partially, a press joint; and/or clamping forces on connecting surfaces of said interconnected system formed by the mutually contacting surfaces of said two components of said interconnected system act in a manner such that at least one of said two components of said interconnected system is deformed at least partially, lastingly, elastically.

25. A measurement transducer of the vibration-type, for a measuring device serving for measuring a medium flowing in a line, comprising:

at least one interconnected system formed by means of at least a first component and by means of at least a second component; and at least said first component of the interconnected system is embodied as a composite, formed partly of at least two materials, which differ from one another with respect to at least one physical and/or with respect to at least one chemical property, wherein:

at least one of said components is subjected, at least partially, lastingly, to mixed plastic-elastic deformations.

* * * * *